United States Patent
Beadle et al.

(10) Patent No.: US 7,194,007 B1
(45) Date of Patent: Mar. 20, 2007

(54) HIGH SPEED MODEM

(75) Inventors: Michael S. Beadle, Tustin, CA (US); Michael M. Metzger, Costa Mesa, CA (US); Jason B. Brent, Foothill Ranch, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 885 days.

(21) Appl. No.: 10/061,171

(22) Filed: Feb. 1, 2002

Related U.S. Application Data (63) Continuation-in-part of application No. 09/990,059, filed on Nov. 20, 2001.

(60) Provisional application No. 60/322,936, filed on Sep. 17, 2001.

(51) Int. Cl.
*H04L 12/66* (2006.01)

(52) U.S. Cl. ........................ 370/463; 370/420

(58) Field of Classification Search ............... 370/463, 370/420; 375/242–254, 268–283, 298, 302–308, 375/322–337
See application file for complete search history.

(56) References Cited

U.S. PATENT DOCUMENTS

| | | | |
|---|---|---|---|
| 5,889,856 A | 3/1999 | O'Toole et al. | |
| 5,959,996 A | 9/1999 | Byers | |
| 6,035,020 A | 3/2000 | Weinstein et al. | |
| 6,072,794 A | 6/2000 | Kang | |
| 6,075,776 A * | 6/2000 | Tanimoto et al. | 370/254 |
| 6,128,300 A | 10/2000 | Horton | |
| 6,188,669 B1 * | 2/2001 | Bellenger | 370/230 |
| 6,195,414 B1 | 2/2001 | Simmons et al. | |
| 6,212,228 B1 * | 4/2001 | Vlajnic | 375/222 |
| 6,215,863 B1 | 4/2001 | Bennett, III et al. | |
| 6,229,814 B1 | 5/2001 | McMillian et al. | |
| 6,229,846 B1 | 5/2001 | Lassig et al. | |
| 6,396,911 B1 * | 5/2002 | Kostan et al. | 379/93.14 |
| 6,400,769 B1 | 6/2002 | Gatherer et al. | |
| 6,411,618 B1 | 6/2002 | Quiring et al. | |
| 6,470,046 B1 * | 10/2002 | Scott | 375/222 |
| 6,498,806 B1 * | 12/2002 | Davis | 375/222 |
| 6,574,280 B1 | 6/2003 | Liau et al. | |
| 6,654,348 B1 * | 11/2003 | Doty et al. | 370/244 |
| 6,704,324 B1 * | 3/2004 | Holmquist | 370/465 |
| 6,751,304 B1 | 6/2004 | Edmon et al. | |
| 6,763,097 B1 * | 7/2004 | Vitenberg | 379/93.31 |
| 6,785,340 B1 * | 8/2004 | Stockman et al. | 375/259 |
| 6,954,463 B1 * | 10/2005 | Ma et al. | 370/401 |

* cited by examiner

*Primary Examiner*—Doris H. To
*Assistant Examiner*—Thai Hoang
(74) *Attorney, Agent, or Firm*—Farjami & Farjami LLP (57) ABSTRACT

Various high speed modem embodiments are provided, for example, having a receiver configured to receive an analog data signal over a telephone line from a first modem, from which digitized analog data signal samples are generated by a processor employing a linear coding process using, for example, a sampling rate of at least 16 kHz with an 8 bits/sample. Following, the digitized analog data signal samples are transmitted over one or more digital lines of a first time division multiplexed bus to a second modem, which may be a digital loop carrier modem, for example. Thereafter, the second modem may demodulate the digitized analog data signal samples to generate digitized data, which may then be transmitted over one or more digital signal lines of a second time division multiplexed bus.

12 Claims, 5 Drawing Sheets

HIGH SPEED MODEM

RELATED APPLICATIONS

The present application is a Continuation-In-Part of U.S. application Ser. No. 09/990,059, filed Nov. 20, 2001, and also claims the benefit of U.S. provisional application Ser. No. 60/322,936, filed Sep. 17, 2001. The above-referenced applications are hereby fully incorporated by reference in the present application.

BACKGROUND OF THE INVENTION

1. Field of the Invention

The present invention generally relates to modem communications and, more particularly, to systems and methods for increasing speed and improving performance of modems.

2. Related Art

As the popularity of the Internet continues to increase, consumers and Internet Service Providers (ISPs) seek new methods and systems for providing data at a higher throughput in a way that requires minimal expense and retrofitting at the subscriber's premises. The need for transferring data at higher rates has been intensifying day by day due to the increased use of the Internet to transfer image files, video files and the like files, which contain a great amount of data. Such need has caused many users to transition away from traditional voiceband analog modems, with a top data rate of about 56,000 bits-per-second (bps) downstream and about 48,000 bps upstream, to more expensive broadband alternatives such as DSL modems, cable modems, T1 or T3 lines. However, it is well known that such alternatives suffer from many drawbacks when compared to analog modems. For example, (1) such alternatives are not versatile and unlike analog modems may not be simply plugged into any phone line that can support voice and all legacy voiceband modem and fax services, (2) DSL and cable services may not be available in many locations, (3) such alternatives typically require costly retrofitting at both central site and the client premises, and (4) such alternatives are considerably more expensive and take more time to be set up.

On the other hand, modems are less expensive, more versatile and take less time to be set up and placed in use, because they take advantage of the existing telephony infrastructure. Copper wire pairs are also referred to as a loop and essentially extend from a customer's premises and terminate, for example, at a linecard in a telephone company central office.

Figure 1:
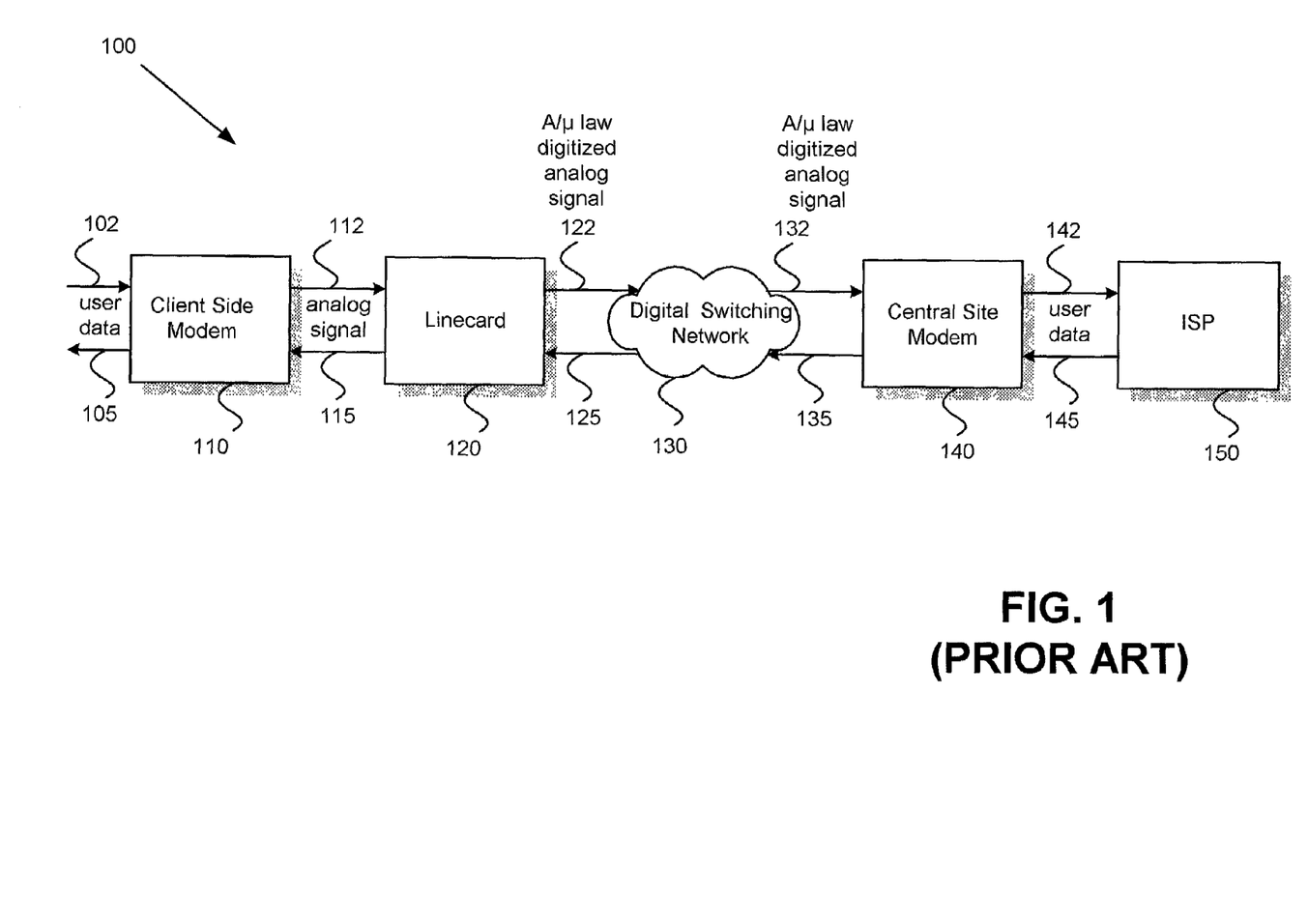
FIG. 1 illustrates a prior art communication system or model.

FIG. 1 illustrates a conventional communication system or model 100 using traditional analog modems (e.g., modems configured in accordance with V.34, V.90 or V.92 standards). As shown, communication system 100 includes client side modem 110 for use by an end-user, such as a modem in a personal computer at home or office. Client side modem 110 receives user data 102 in digital form from the personal computer (not shown) and converts user data 102 to analog form (modulated data) for transmission as analog signal 112 over the local loop to the central office. In addition, client side modem 110 receives analog signal 115 over the local loop from the central office and converts analog signal 115 to digital form and transmits user data 105 to the personal computer. As discussed above, the local loop carrying analog signals 112 and 115 terminates at linecard 120 located at the central office. For example, linecard 120 receives analog signal 112 from client side modem 110 and provides A/μ-law digitized analog signal 122 to central site modem 140 over digital switching network 130, and further receives A/μ-law digitized analog signal 125 from central site modem 140 and provides analog signal 115 to client side modem 110.

As shown in FIG. 1, A/μ-law digitized analog signal 122 is transmitted over digital switching network 130 and received as A/μ-law digitized analog signal 132 by central site modem 140, which converts A/μ-law digitized analog signal 132 to user data 142 in digital form (or demodulated data) for use by a remote device, such as Internet Service Provider ("ISP") 150. Similarly, ISP 150 transmits user data 145 in digital form to central site modem 140 for conversion to A/μ-law digitized analog signal 135 and transmission over digital switching network 130, which signal is received by linecard 120 as A/μ-law digitized analog signal 125 and provided to client side modem 110 over the local loop as analog signal 115 for conversion to user data 105 and use by the computer or terminal at the client premises.

It is the conversion to A/μ-law PCM at 8 kHz sample rate that generally is the main impairment that limits the data rates, which imposes a theoretical maximum connection speed of 64 kbps and a practical limit of below 56 kbps, as provided by traditional modems supporting V.92/V.90 modulation. Furthermore, such modems must determine and compensate for digital network impairments, far end echo, send answer tone to turn off echo suppressor and echo canceler existing in communication system 100.

Moreover, a commercially available broadband alternative, such as DSL, also falls short of being a complete solution. For example, DSL is defined primarily to achieve very much higher speeds of up to several mega bits per second, and uses less complex modulation schemes to aid hardware implementation of the highest available speeds. As a result, DSL service is not available on many lines that can support a substantially higher data rate than 56 kbps, but cannot support the lowest provided speeds of current DSL technology.

Accordingly, there in an intense need to provide a new and revolutionary communication model, which provides substantially higher data rates for modems and eliminates current limitations and impairments in today's modem communication systems. There is also a long-felt need for new communication models using existing copper wire infrastructure, with minimal upgrade, which can provide data rates commensurate with existing digital lines and that can eliminate the need for time consuming and expensive installations of new infrastructure for T1, T3 and DSL lines.

SUMMARY OF THE INVENTION

In accordance with the purpose of the present invention as broadly described herein, there is provided various high speed modem embodiments. In one aspect of the present invention, a data communication method is provided for communication over a time division multiplexed bus having one or more digital lines. The data communication method includes the step of receiving an analog data signal over a telephone line from a first modem. Subsequently, a linear coding process is employed to generate digitized analog data signal samples from the received analog data signal. For example, the linear coding process can use a sampling rate of about 16 kHz with an 8 bits/sample. Following, the digitized analog data signal samples are transmitted over one or more digital lines to a second modem, which may be a remote access server modem, for example.

In another aspect, an analog data signal is received from a first modem over a telephone line and is then converted to digitized analog data signal samples by a linear coding process. The linear coding process may use a sampling rate of about 16 kHz with an 8 bits/sample. The digitized analog data signal samples are then transmitted to a second modem over one or more digital signal lines of a first time division multiplexed bus, which demodulates the digitized analog data signal samples to generate digital data. The second modem may be a digital loop carrier modem, for example. Following, the second modem transmits the digital data over one or more digital signal lines of a second time division multiplexed bus.

In another aspect, a data communication system for communication with a first modem over a telephone line is provided. The communication system includes a receiver capable of receiving an analog data signal over the telephone line from the first modem and a processor capable of applying a linear coding process to generate digitized analog data signal samples from the analog data signal. Furthermore, the communication system also includes a transmitter capable of transmitting the digitized analog data signal samples to a second modem over one or more digital signal lines of a time division multiplexed bus.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like.

Such general techniques that may be known to those skilled in the art are not described in detail herein. It should be appreciated that the particular implementations shown and described herein are merely exemplary and are not intended to limit the scope of the present invention in any way.

Figure 2:
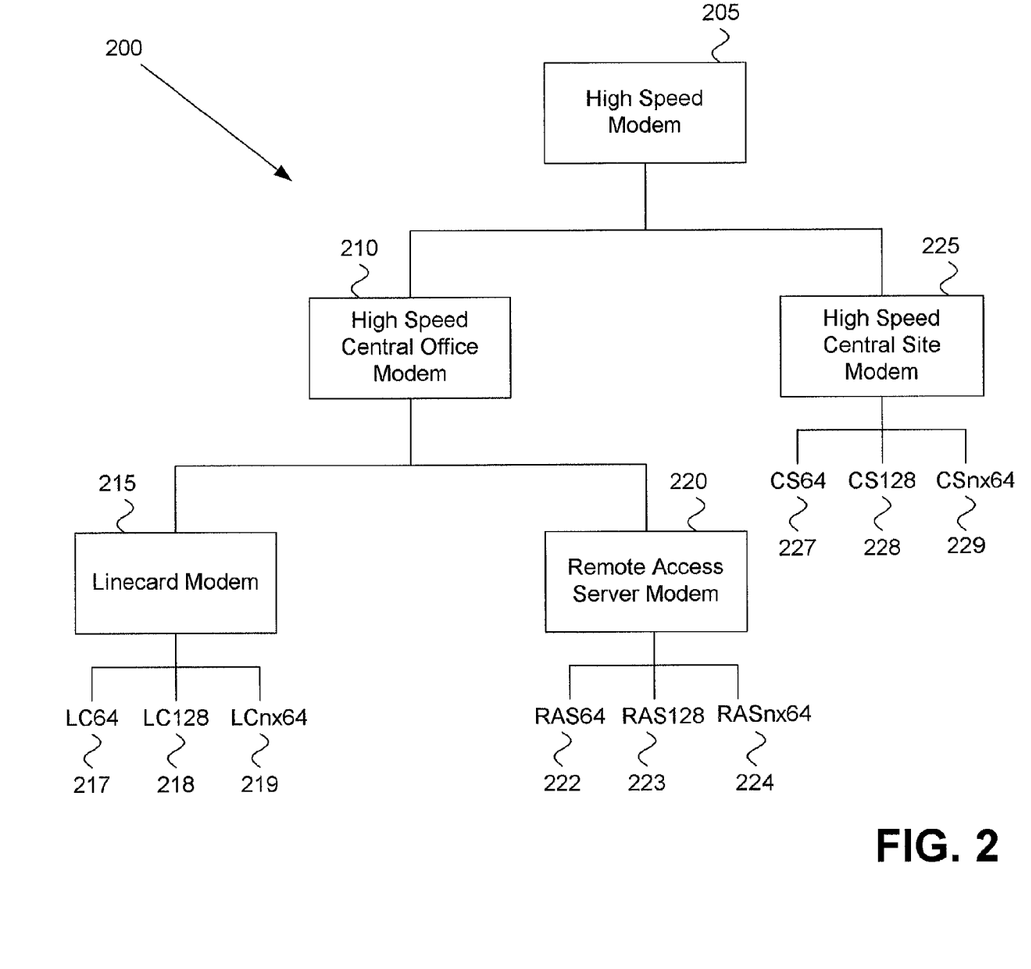
FIG. 2 illustrates an overview diagram of some exemplary embodiments of the present invention.

FIG. 2 illustrates overview diagram 200 including some exemplary embodiments of the present invention. As shown in FIG. 2, high speed modem 205 may generally be categorized as high speed central office modem 210 and high speed central site modem 225. Furthermore, according to one embodiment, high speed central office modem 210 may be implemented as linecard modem 215. Linecard modem 215 is described in U.S. application Ser. No. 09/990,059, filed Nov. 20, 2001. As described therein, linecard modem 215 may, for example, be incorporated into or be in communication with a linecard. Linecard modem 215 can be configured to convert data using a linear coding method with a sampling rate of at least 16 kHz with an 8 bits/sample. It is noted that a higher processing speed and sampling rate would improve the high speed modem 205 performance. Preferably, the format for the digitized analog samples is linear/uniform spacing rather than A/μ-law PCM. Linecard modem 215 may have various flavors including, for example, 64 kbps linecard modem 217, 128 kbps linecard modem 218 and nx64 kpbs linecard modem 219. In some embodiments, linecard modem 215 may support 2400 bps increments.

As shown in FIG. 2, high speed central office modem 210 may be implemented as remote access server modem 220. Remote access server modem 220 is described in detail below in conjunction with FIGS. 3–5. Similar to Linecard modem 215, remote access server modem 220 may have various flavors including, for example, 64 kbps remote access server modem 222, 128 kbps remote access server modem 223 and nx64 kpbs remote access server modem 224 and, in some embodiments, remote access server modem 220 may support 2400 bps increments.

Continuing with FIG. 2, high speed modem 205 may also be implemented as high speed central site modem 225. High speed central site modem 225 may have an arrangement similar to that of communication system 100, and can be configured to convert data using a linear coding method with a sampling rate of at least 16 kHz with an 8 bits/sample, rather than A/μ-law PCM. High speed central site modem 225 may have various flavors including, for example, 64 kbps central site modem 227, 128 kbps central site modem 228 and nx64 kpbs central site modem 229. Further, central site modem 227 may use a single DS0 to transport data, whereas central site modem 229 may use multiple DS0's to transport data.

It should be noted that each type of high speed modem 205 may have a different channel or impairment model. For example, high speed central site modem 225 may experience round trip delays, digital network impairments (such as those experienced by traditional analog modems), in addition to the impairments that may be experienced by remote access server modem 220. On the other hand, remote access server modem 220 may have some digital network impairments, such as robbed bits, digital pads and uncontrolled timeslot ordering since digitized analog signals may be switched between the linecard and remote access server modem 220, as described below. Further, in some embodiments, remote access server modem 220 may have a full control of the A/D converter sampling rates using a control path between remote access server modem 220 and the linecard. However, if such a control path is not available, a fixed sampling scheme may be used, for example, depending upon the digital bandwidth between the linecard and remote access server modem 220. For instance, 64 kbps remote access server modem 222 may assume 8-bit samples at 8 kHz, 128 kbps remote access server modem 223 may assume 8-bit samples at 16 kHz, a 192 kbps remote access server modem may assume 8-bit samples at 24 kHz, and so on. As a further example, with a control path, the 192 kbps remote access server modem may provide a higher connection speed with 4-bit samples at 48 kHz under certain conditions.

Figure 3:
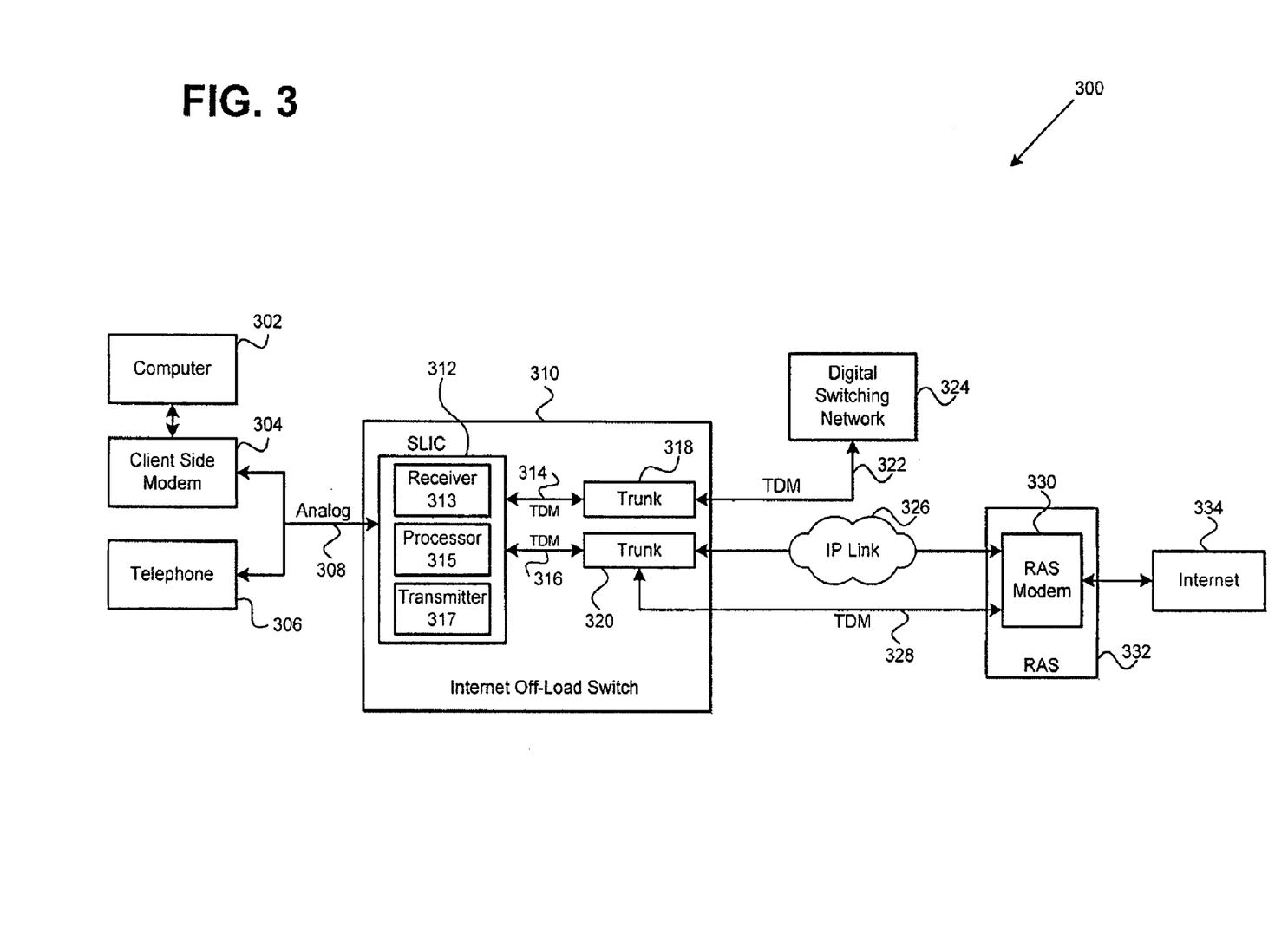
FIG. 3 illustrates a communication system or model according to one embodiment of the present invention.

FIG. 3 illustrates communication system or model 300 according to one embodiment of the present invention. As shown, communication system 300 includes computer 302 connected to client side modem 304, which receives data in digital form from computer 302 and converts the digital data to analog form (or modulated data). In one embodiment, client side modem 304 can be configured to modulate and transmit the data at a high speed modem rate, which is defined as a rate exceeding rates achieved currently by analog modems configured in accordance with V.34, V.90 or V.92 standards. The analog signal can then be transmitted over local loop 308, which terminates at Internet off-load switch 310. In addition to carrying modulated data from client side modem 304, local loop 308 also carries voice calls from telephone 306 to Internet off-load switch 310. Additionally, client side modem 304 receives analog signals from Internet off-load switch 310, and the analog signal can be demodulated by client side modem 304 for use by computer 302.

Both data and voice calls arriving at Internet off-load switch 310 from either client side modem 304 or telephone 306 are received by receiver 313 of subscriber line interface circuit ("SLIC") 312, which can be configured to distinguish between data and voice calls based on, for example, the number dialed. In the event of a data call, SLIC 312 can be additionally configured to determine whether client side modem 304 can support a high speed modem rate based on, for example, a message, indication, tone, handshaking process or other suitable protocols. Further, SLIC 312 can be configured to convert, or "digitize", both data and voice calls into digital form for transmission over digital networks. Calls determined by SLIC 312 to be voice calls can be digitized by SLIC 312 using a conventional A/μ-law pulse code modulation ("PCM") method. After digitization by SLIC 312, voice calls can be diverted to trunk 318 via time division multiplexed ("TDM") bus 314 and transmitted to digital switching network 324 via TDM bus 322. As is known, voice calls digitized using A/μ-law are typically sampled at 8 kHz with 8 bits per sample, resulting in a 64 kbps data rate. Thus, a voice call can be transmitted over a TDM bus using a single digital signal ("DS0") channel. Additionally, SLIC 312 receives digitized signals from digital switching network 324 via TDM bus 322, trunk 318 and TDM bus 314 and converts the signals to analog form for transmission to telephone 306 over local loop 308.

In one embodiment, processor 315 of SLIC 312 can be configured to convert data using a linear coding method with a sampling rate of at least 16 kHz with an 8 bits/sample. For example, the sampling rate may be 24 kHz, 32 kHz, 48 kHz and so on. In a preferred embodiment, the format for the digitized analog samples is linear/uniform spacing rather than A/μ-law PCM. In one embodiment, the analog data signal is digitized by SLIC 312 without 4 kHz filtering. The digitized signal is then diverted to trunk 320 over TDM bus 316 using transmitter 317, and depending on the particular sampling rate of SLIC 312, one or more DS0 channels may be utilized to provide sufficient bandwidth for carrying the signal. For example, if SLIC 312 digitizes data at 16 kHz with an 8 bits/sample, or preferably at a higher rate, the resulting digitized signal would be at 128 kbps and thus may require two DS0 channels. From trunk 320, the digitized signal is transmitted to remote access server ("RAS") 332. In one embodiment, transmission of the digitized signal to RAS 332 is achieved over IP link 326, which is a packet-based connection. In another embodiment, the digitized signal is transmitted to RAS 332 via TDM bus 328, and in such embodiment, a sufficient number of DS0 channels may be used to carry the signal. As shown, digitized signals arriving at RAS 332 are received by RAS modem 330, which is also referred to as a "terminating modem" in the present application. The digitized signals can be demodulated by RAS modem 330 and transmitted to Internet 334. In one embodiment, RAS modem 330 can be configured to demodulate the digitized signal at a speed compatible with the digitization rate of SLIC 312.

Additionally in communication system 300, either IP link 326 or TDM bus 328 can carry digitized signals from RAS 332 to SLIC 312 by way of trunk 320 and TDM bus 316. SLIC 312 can be configured to convert the received signals to analog form for transmission to client side modem 304. Communication system 300 can support any multiple 64 kbps data rates at speeds of several mega bytes and at various increments, such as 2400 bps, and can support access to any digital network that is configured to support high speed digital data, such as T1, fractional T1, T3 and various DSL flavors.

Thus, FIG. 3 illustrates a communication system or model wherein a client side modem can be configured to modulate data at high speed modem rates, i.e. speeds greater than 56 kbps, for transmission over a local loop to an Internet off-load switch having a SLIC. The SLIC is configured to distinguish between data and voice calls and to digitize data using a linear compression technique, which supports digitization at a sampling rate of at least 16 kHz with 8 bits/sample. The digitized signal is then diverted to a RAS modem over either an IP link or a TDM bus, in which case more than one DS0 channels may be utilized to carry the signal. The RAS modem can be configured to demodulate the signal and transmit the data to the Internet, for example. In this manner, the communication system illustrated in FIG. 3 is able to achieve data rates exceeding the existing 56 kbps data rate limit of conventional V.90/V.92 channel models and to achieve higher data rates that can only be limited by the maximum capacity of the digital line to the remote access server, but which is not limited by the voiceband analog to digital conversion.

Figure 4:
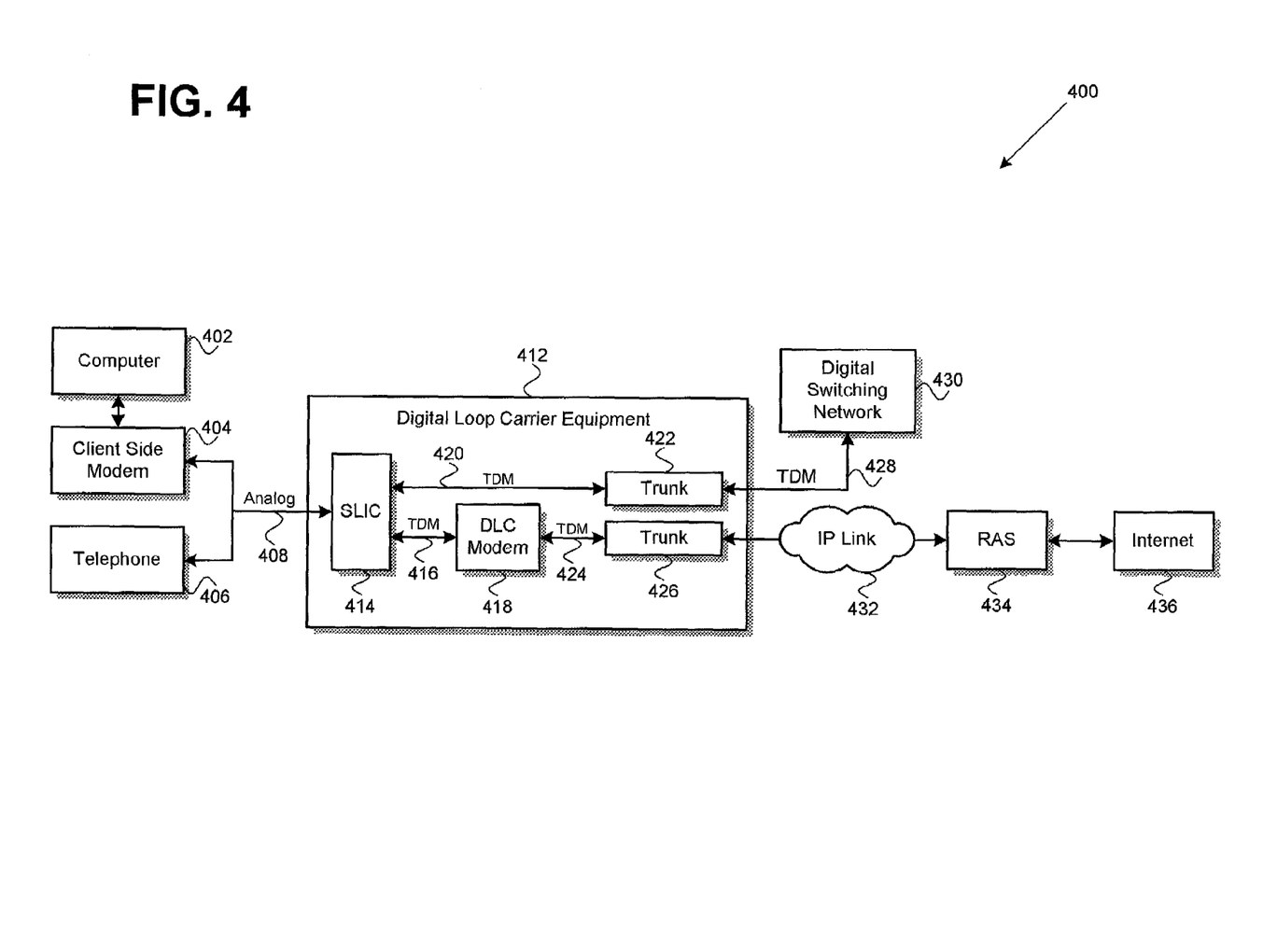
FIG. 4 illustrates a communication system or model according to one embodiment of the present invention.

Reference is now made to FIG. 4, which illustrates communication system or model 400 according to one embodiment of the invention. In communication system or model 400, computer 402 is connected to client side modem 404, which modulates data in digital form from computer 402 to analog form for transmission over local loop 408 to digital loop carrier equipment ("DLC") 412. In one embodiment, client side modem 404 is configured to modulate the data from computer 402 at a high speed modem rate, i.e. at a rate greater than 56 kbps. As shown, local loop 408 also carries voice calls from telephone 406 to DLC 412.

Continuing with FIG. 4, DLC 412 comprises SLIC 414, which receives analog signals arriving at DLC 412. SLIC 414 can be configured to determine whether the incoming call is data or voice in a manner known in the art, such as by the number dialed by the calling equipment, e.g., modem 404 or telephone 406. Voice calls can be digitized by SLIC 416 using a conventional A/μ-law PCM method, which generates a 64 kbps digitized voice signal. SLIC 414 can then divert the digitize voice call to trunk 422 over TDM bus 420. The signal is then transmitted to digital switching network 430 over TDM bus 428 using, for example, one DS0 channel.

On the other hand, when SLIC 414 determines that an incoming call is a data call, SLIC 414 can be configured in one embodiment to determine whether client side modem 404 is a high speed modem, and in such event to digitize data coming from client side modem 404 at a rate commensurate with the modulation/transmission rate of client side modem 404. For example, SLIC 414 can use a sampling rate of at least 16 kHz with 8 bits/sample. Accordingly, the resulting digitized data signal would be 128 kbps. If SLIC 414 determines that client side modem 404 is not communicating at high speed modem rates, then SLIC 414 can digitize the data signal using, for example, a conventional A/µ-law PCM method. A data signal digitized by SLIC 414 can then be transmitted over TDM bus 416 to a terminating modem, i.e. DLC modem 418. The transmission of the digitized signal may utilize more than one DS0 channel of TDM bus 416, depending on the rate at which SLIC 414 digitizes the data. For instance, the data digitized by SLIC 414 at a sampling rate of, for example, 16 kHz at 8 bits/sample would require two DS0 channels.

As shown, DLC modem 418 is situated inside DLC 412 in the present embodiment, but may also be situated in a central office or at a remote access server, for example. The digitized signal is then demodulated by DLC modem 418. In one embodiment, DLC modem 418 can be configured to demodulate the digitized signal of data calls at a rate greater than 64 kbps, and preferably at a rate compatible with the digitization rate of SLIC 414. Following demodulation by DLC modem 418, the signal can be diverted to trunk 426 over TDM bus 424, utilizing one or more DS0 channels to carry the signal. The signal is then transmitted over IP link 432 to RAS 434 and then Internet 436.

Additionally, in communication system 400, data from Internet 436 can be transmitted to DLC 412 by way of RAS 434 and IP link 432. At DLC 412, the data from Internet 436 is relayed to DLC modem 418 through trunk 426 and TDM bus 424. In one embodiment, DLC modem 418 modulates the data from Internet 436 at a rate greater than 64 kbps, and the modulated signal is transmitted to SLIC 414 over a sufficient number of DS0 channels of TDM bus 416. For example, if DLC modem 418 modulates data from Internet 436 at 256 kbps, then four DS0 channels may be required. Also, calls from digital switching network 430 can be transmitted to SLIC 414 over TDM bus 428, trunk 422 and TDM bus 420.

Continuing with FIG. 4, SLIC 414 can be configured to convert signals it receives from either digital switching network 430 or Internet 436 to analog form for transmission over local loop 408. For example, voice calls coming from digital switching network 430 can be converted by SLIC 414 using a standard A/µ-law PCM method and transmitted over local loop 408 to telephone 406. In one embodiment, SLIC 414 can be configured to convert data from Internet 436 modulated by DLC modem 418 to analog form at a rate greater than 64 kbps. The analog signal is then transmitted over local loop 408 to client side modem 404, which demodulates the signal into digital form for use by computer 402.

Thus, FIG. 4 illustrates a communication system or model wherein a client side modem modulates data at high speed modem rates, i.e. rates greater than 56 kbps, for transmission over a local loop to a digital loop carrier equipment having a SLIC. The SLIC determines whether the call is a data or voice call and can be configured to digitize data using a linear compression technique which supports digitization at a sampling rate of at least 16 kHz with 8 bits/sample, for example. Voice calls can be digitized using the standard A/µ-law PCM method, for example. For data calls, the digitized signal is transmitted over a sufficient number of DS0 channels to a terminating modem, which can be situated in the DLC. The modem can be configured to modulate the digitized signal at speeds exceeding 64 kbps for transmission to the Internet, for example. In this manner, the present invention achieves higher data rates than current conventional modem systems.

In one embodiment, data calls from a client side modem over the local loop may be terminated at a linecard configured to support high speed modem rates. The linecard, which can be situated near or at a central office, for example, may be configured to determine whether the call is a voice or data call and to also detect whether the client side modem supports high speed modem rates. In one embodiment, the linecard can be configured to digitize the incoming data at a sampling rate of at least 16 kHz with a minimum of 8 bits/sample. The digitized signal is then sent through the digital switching network to a remote access server utilizing, for example, a sufficient number of DS0 channels to carry the signal. The remote access server can comprise a modem capable of demodulating the signal from the linecard at a rate greater than 56 kbps, and preferably at a rate that matches the rate at which the linecard digitized the signal. In this manner, a data rate greater than that of conventional analog modem systems is achieved.

Figure 5:
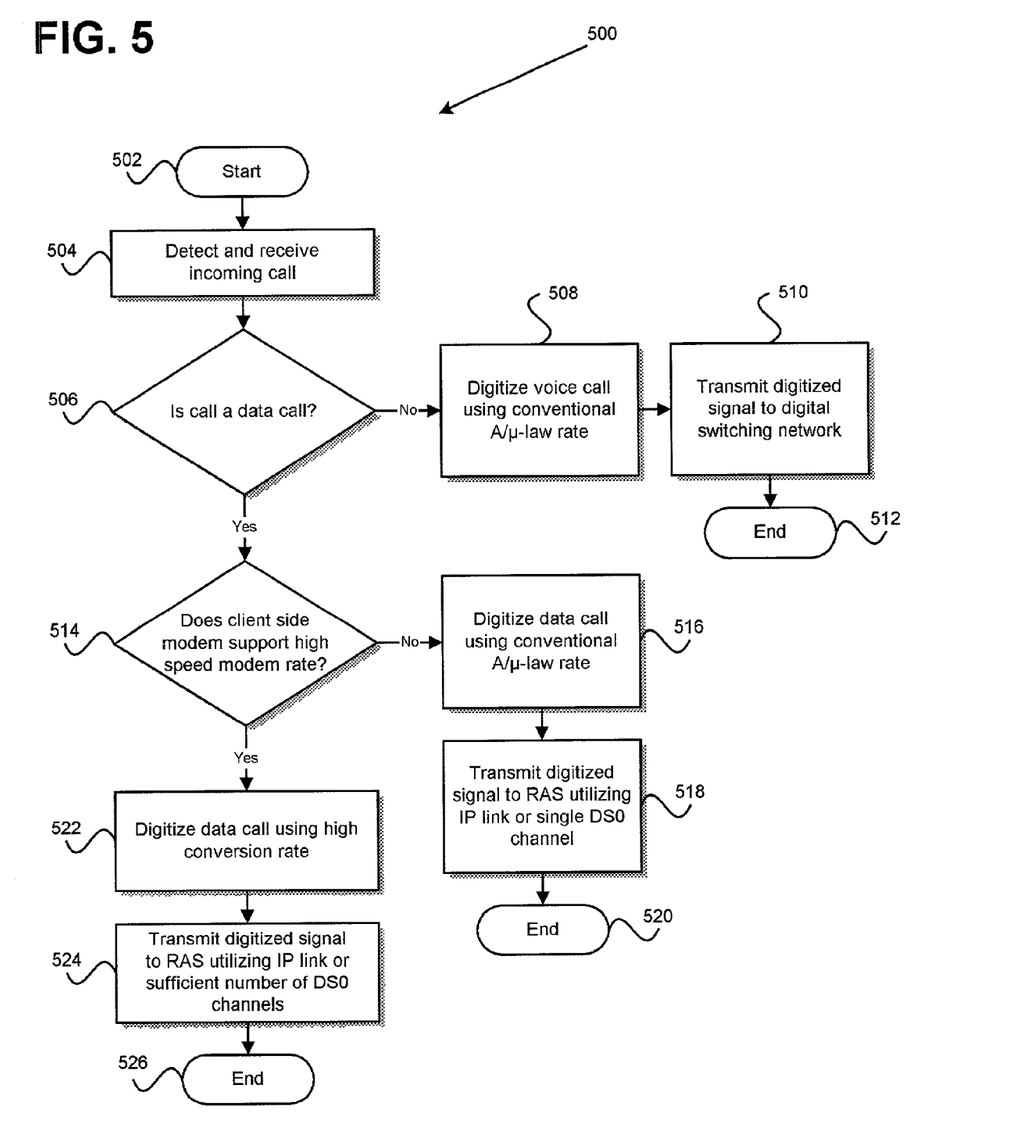
FIG. 5 illustrates an exemplary flow diagram of a communication method utilizing the communication system of FIG. 3.

Referring now to FIG. 5, high speed modem process 500 is illustrated in accordance with one embodiment. High speed modem process 500 can be implemented in the context of a communication system such as communication system 300 in FIG. 3. High speed modem process 500 begins at step 502 and proceeds to step 504 where SLIC 312 detects and receives an incoming call from, for example, either client side modem 304 or telephone 306.

Next, at step 506, SLIC 312 determines whether the incoming call is a voice or data call. If it is determined at step 506 that the incoming call is a voice call, then high speed modem process 500 proceeds to step 508 where the signal is digitized using, for example, a conventional A/µ-law PCM method. Next, at step 510, the digitized signal can be transmitted across the digital switching network to the receiving party, and high speed modem process then ends at step 512.

If SLIC 312 determines instead at step 506 that the incoming call is a data call, then high speed modem process 500 continues to step 514 where SLIC 312 determines whether the calling client side modem, i.e. client side modem 304, supports high speed modem rates, i.e. at rates exceeding 56 kbps. This determination can be done by a handshaking process, for instance, whereby SLIC 312 can exchange information with client side modem 304 regarding the data rate of client side modem 304. SLIC 312 may also inform client side modem 304 whether SLIC 312 is configured to digitize data at rates compatible with high speed modem rates. For example, if SLIC 312 is capable of digitizing and transmitting at a sampling rate of at least 16 kHz with 8 bits/sample, then SLIC 312 can send an appropriate message to the client side modem indicating this capability. Continuing with step 514, if SLIC 312 determines that the client side modem does not support a high speed modem rate, then high speed modem process 500 proceeds to step 516 where the signal is digitized using suitable conventional conversion rate, for example, by using A/μ-law PCM. Next, at step 518, the digitized signal may be transmitted by SLIC 312 to a terminating modem via an IP link or a single DS0 channel, for example, after which high speed modem process 500 continues to, and ends at, step 520.

If it is determined at step 514 that client side modem 304 is capable of supporting a high speed modem rate, then high speed modem process 500 continues to step 522 where SLIC 312 digitizes the signal from client side modem 304 at a rate compatible with the data rate of the client side modem. For example, in one embodiment, the signal can be digitized using a linear format with a minimum sampling rate of 16 kHz at no less than 8 bits/sample.

Next, high speed modem process 500 continues to step 524 where the digitized signal is transmitted by SLIC 312 to, for example, a terminating modem. Transmission can be achieved via an IP link. Alternatively, transmission of the digitized signal can be done over a suitable number of DS0 channels of a TDM bus. In one embodiment, the terminating modem is located at a remote access server, while in another embodiment, the terminating modem is placed together with SLIC 312 on the same Internet off-load switch. The terminating modem can be configured to demodulate the digitized signal transmitted by SLIC 312 at a rate compatible with the digitizing rate of SLIC 312. High speed modem process 500 then proceeds to, and ends at, step 526.

Accordingly, the present invention provides a communication system that is capable of bridging the gap between the traditional analog modems and the existing broadband modems, such as DSL modems. Various embodiments of the present invention are capable of supporting data rates in excess of 64 kbps on communication lines that cannot support DSL connections. In addition, various embodiments can be placed in use on existing telephone lines with only minor modifications to the existing infrastructure. Furthermore, communication systems of the present invention, unlike existing broadband systems, do not require the use of analog splitters. These and other advantages of the present invention can be attained by implementing different flavors of high speed modem systems described above, while still supporting all existing voice and voiceband modem services.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method of data communication over a first time division multiplexed bus, including one or more digital signal lines, said method comprising:
   determining whether an incoming call is a voice call or a data call;
   receiving an analog data signal over a voiceband of a telephone line from a first analog modem for said data call;
   utilizing a linear coding process to generate a plurality of digitized analog data signal samples from said analog data signal;
   transmitting said plurality of digitized analog data signal samples via said one or more digital signal lines of said first time division multiplexed bus to a second analog modem;
   demodulating said plurality of digitized analog data signal samples by said second analog modem to generate digital data;
   transmitting said digital data by said second analog modem over one or more digital signal lines of a second time division multiplexed bus;
   utilizing a non-linear coding process to generate a plurality of digitized analog voice signal samples from an analog voice signal received over said voiceband of said telephone line for said voice call; and
   transmitting said plurality of digitized analog voice signal samples via one or more digital signal lines of a third time division multiplexed bus.

2. The method of claim 1, wherein said linear coding process uses a sampling rate of about 16 kHz with an 8 bits/sample.

3. The method of claim 1, wherein said second analog modem is a digital loop carrier modem.

4. The method of claim 1, wherein said digital data reach a remote access server over an IP link.

5. The method of claim 1, wherein said transmitting said digital data transmits said digital data via two of said one or more digital signal lines of said second time division multiplexed bus.

6. The method of claim 1, wherein prior to said receiving, said method further comprises determining said first analog modem to be capable of supporting a speed of 64 kbps or more.

7. A data communication system for communication with a first modem over a telephone line, said communication system comprising:
   a receiver capable of receiving an analog data signal over a voiceband of a telephone line from a first analog modem for a data call;
   a processor capable of applying a linear coding process to said analog data signal to generate a plurality of digitized analog data signal samples;
   a transmitter capable of transmitting said plurality of digitized analog data signal samples via one or more digital signal lines of a first time division multiplexed bus;
   a second analog modem in communication with said first time division multiplexed bus;
   wherein said second analog modem receives said plurality of digitized analog data signal samples via said one or more digital signal lines of said first time division multiplexed bus, demodulates said plurality of digitized analog data signal samples to generate digital data, and transmits said digital data over one or more digital signal lines of a second time division multiplexed bus; and
   wherein a non-linear coding process is utilized to generate a plurality of digitized analog voice signal samples from an analog voice signal received over said voiceband of said telephone line for a voice call, and said plurality of digitized analog voice signal samples are transmitted via one or more digital signal lines of a third time division multiplexed bus.

8. The communication system of claim 7, wherein said linear coding process uses a sampling rate of about 16 kHz with an 8 bits/sample.

9. The communication system of claim 7, wherein said second analog modem is a digital loop carrier modem.

10. The communication system of claim 7, wherein said digital data reach a remote access server over an IP link.

11. The communication system of claim 7, wherein said second modem transmits said digital data via two of said one or more digital signal lines of said second time division multiplexed bus.

12. The communication system of claim 7, wherein prior to said receiver receiving said analog data signal, said processor determines whether said first analog modem is capable of supporting a speed of 64 kbps or more.

* * * * *